(12) United States Patent
Katoh et al.

(10) Patent No.: US 6,474,913 B2
(45) Date of Patent: Nov. 5, 2002

(54) TOOL MANAGEMENT SYSTEM

(75) Inventors: Koichi Katoh, Shizuoka (JP); Yasunori Katoh, Shizuoka (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/866,943

(22) Filed: May 30, 2001

(65) Prior Publication Data

US 2001/0049325 A1 Dec. 6, 2001

(30) Foreign Application Priority Data

| May 31, 2000 | (JP) | ..... 2000-163437 |
| Jun. 5, 2000 | (JP) | ..... 2000-168231 |
| Aug. 22, 2000 | (JP) | ..... 2000-251096 |

(51) Int. Cl.[7] ............... B23C 9/00; B23Q 15/00
(52) U.S. Cl. ............... 409/131; 408/1 R; 451/5
(58) Field of Search ............... 483/1, 13; 451/5; 409/131, 132, 231, 232, 234, 230, 193, 189, 211; 408/124, 239 A, 126, 1 R; 33/561

(56) References Cited

U.S. PATENT DOCUMENTS

| 3,752,595 A | * | 8/1973 | Woythal et al. ............. 279/144 |
| 4,077,736 A | * | 3/1978 | Hutchens et al. ............. 173/217 |
| 4,716,657 A | * | 1/1988 | Collingwood ................. 33/561 |
| 4,741,650 A | * | 5/1988 | Nakata ........................ 408/126 |
| 4,805,404 A | * | 2/1989 | Dupin ........................... 60/409 |
| 5,564,872 A | * | 10/1996 | Veil et al. ..................... 33/561 |
| 5,636,949 A | * | 6/1997 | Nakamura et al. ...... 408/239 A |
| 5,697,739 A | * | 12/1997 | Lewis et al. ................. 409/211 |

FOREIGN PATENT DOCUMENTS

| GB | 2014332 | * | 8/1979 | ................. 409/193 |
| JP | 363109941 A | * | 5/1988 | ................. 409/231 |

* cited by examiner

*Primary Examiner*—William Briggs
(74) *Attorney, Agent, or Firm*—Pillsbury Winthrop LLP

(57) ABSTRACT

A tool, attachable to a spindle of a machine tool and capable of changing independently a rotational speed of a cutting tool from that of the spindle, provided with a cutting tool for machining a workpiece, an electric motor for driving the machining tool, a generator for generating electric power to drive the electric motor by the rotation of the spindle, a tool holding part for rotatably holding the cutting tool, a casing for holding the electric motor, the generator, the tool attachment part, and the tool holding part, and a locking part for preventing rotation of the casing by engagement with a non-rotating part of the machine tool.

1 Claim, 11 Drawing Sheets

TOOL MANAGEMENT SYSTEM

BACKGROUND OF THE INVENTION

1. Field of the Invention

The present invention relates to a tool and a tool holder to be used in a machine tool. More particularly, the present invention relates to a tool and tool holder removably attachable to the spindle of a machine tool.

2. Description of the Related Art

In a machine tool provided with a spindle such as machining center, the maximum rotational speed of the spindle is determined by the structure of a bearing rotatably supporting the spindle and a lubrication system of this bearing. For this reason, when it is necessary to rotate a tool at a higher rotational speed than the maximum rotational speed of the spindle, an accelerating apparatus is used.

As the accelerating apparatus, for example, an accelerating apparatus provided with a gear mechanism such as an epicyclic gearing which holds the tool and is removably attachable to the spindle is well known.

However, when raising the rotational speed of the tool to a higher speed than the maximum rotational speed of the spindle by the above gear mechanism, the accelerating apparatus increasingly generates heat at a super high rotational speed such as tens of thousands to hundreds of thousands of revolutions per minute, so the machining tolerance of a workpiece can be influenced by the heat. Further, at the above super high rotational speed, the noise from the accelerating apparatus can also increase. Furthermore, a highly reliable precision structure able to withstand the above super high rotational speed is required for the accelerating apparatus, so there is the disadvantage that the manufacturing cost becomes relatively high.

SUMMARY OF THE INVENTION

An object of the present invention is to provide a tool and a tool holder capable of changing the rotational speed of a machining tool for machining a workpiece independently from the rotational speed of a spindle of a machine tool.

Another object of the present invention is to provide a machine tool provided with the above tool and tool holder.

Still another object of the present invention is to provide a method of driving the above tool.

Still another object of the present invention is to provide a tool management system for managing the above tool.

According to a first aspect of the present invention, there is provided a tool attachable to a spindle of a machine tool comprising a machining tool for machining a workpiece; an electric motor for driving the machining tool; and a generator for generating electric power to drive the electric motor by the rotation of the spindle.

According to a second aspect of the present invention, there is provided a tool attachable to a spindle of a machine tool comprising a machining tool for machining a workpiece; an electric motor for driving the machining tool; a generator for generating electric power to drive the electric motor by the rotation of the spindle; and a control means for controlling a supply of electric power generated by the generator to drive and control the machining tool.

According to a third aspect of the present invention, there is provided a tool attachable to a spindle of a machine tool comprising a machining tool for machining a workpiece; an electric motor for driving the machining tool; a generator for generating electric power to drive the electric motor by the rotation of the spindle; an electric power receiving part other than the electric motor for receiving supply of the electric power; a secondary battery able to supply power to the electric power receiving part; and a charging circuit for charging the secondary battery with part of the electric power generated by the generator.

According to a fourth aspect of the present invention, there is provided a tool attachable to a spindle of a machine tool comprising a machining tool for machining a workpiece; an electric motor for driving the machining tool; a generator for generating electric power to drive the electric motor by the rotation of the spindle; a processing circuit for processing data related to machining of the workpiece by the machining tool; and a transmitting and receiving circuit for performing at least one of transmission and reception of a wireless signal indicating information related to machining of a workpiece by the machining tool.

According to a fifth aspect of the present invention, there is provided a tool holder attachable to a spindle of a machine tool for rotatably holding a machining tool for machining a workpiece, the tool holder comprising an electric motor for driving the machining tool and a generator for generating electric power to drive the electric motor by the rotation of the spindle.

According to a sixth aspect of the present invention, there is provided a machine tool comprising a machine tool body provided with a spindle, a driving means for driving the spindle, and at least one control axis for changing a relative position between the spindle and a workpiece; a control apparatus for controlling the driving means and the control axis in accordance with a machining program; and a tool attachable to the spindle and provided with a machining tool for machining a workpiece, an electric motor for driving the machining tool, and a generator for generating electric power to drive the electric motor by the rotation of the spindle.

According to a seventh aspect of the present invention, there is provided a method of driving a tool attachable to a spindle of a machine tool, the tool being provided with a machining tool for machining a workpiece, an electric motor for driving the machining tool, and a generator for generating electric power to drive the electric motor by the rotation of the spindle, comprising the steps of generating alternating current having a frequency in accordance with the rotational speed of the spindle; driving the electric motor by the generated alternating current; and controlling the rotational speed of the machining tool in accordance with the frequency of the alternating current.

According to an eighth aspect of the present invention, there is provided a tool management system comprising a tool attachable to a spindle of a machine tool, the tool comprising a machining tool for machining a workpiece, an electric motor for driving the machining tool, a generator for generating electric power to drive the electric motor by the rotation of the spindle, a processing circuit for processing data related to machining of the workpiece by the machining tool; a transmitting and receiving circuit for performing at least one of transmission and reception of a wireless signal indicating information related to machining of a workpiece by the machining tool; and a management apparatus for performing at least one of reception of data from the transmitting and receiving circuit and transmission of data to the receiving circuit and managing the data.

BRIEF DESCRIPTION OF THE DRAWINGS

These and other objects and features of the present invention will be more apparent from the following description of the preferred embodiments given in relation to the accompanying drawings, wherein.

DESCRIPTION OF THE PREFERRED EMBODIMENTS

Figure 1:
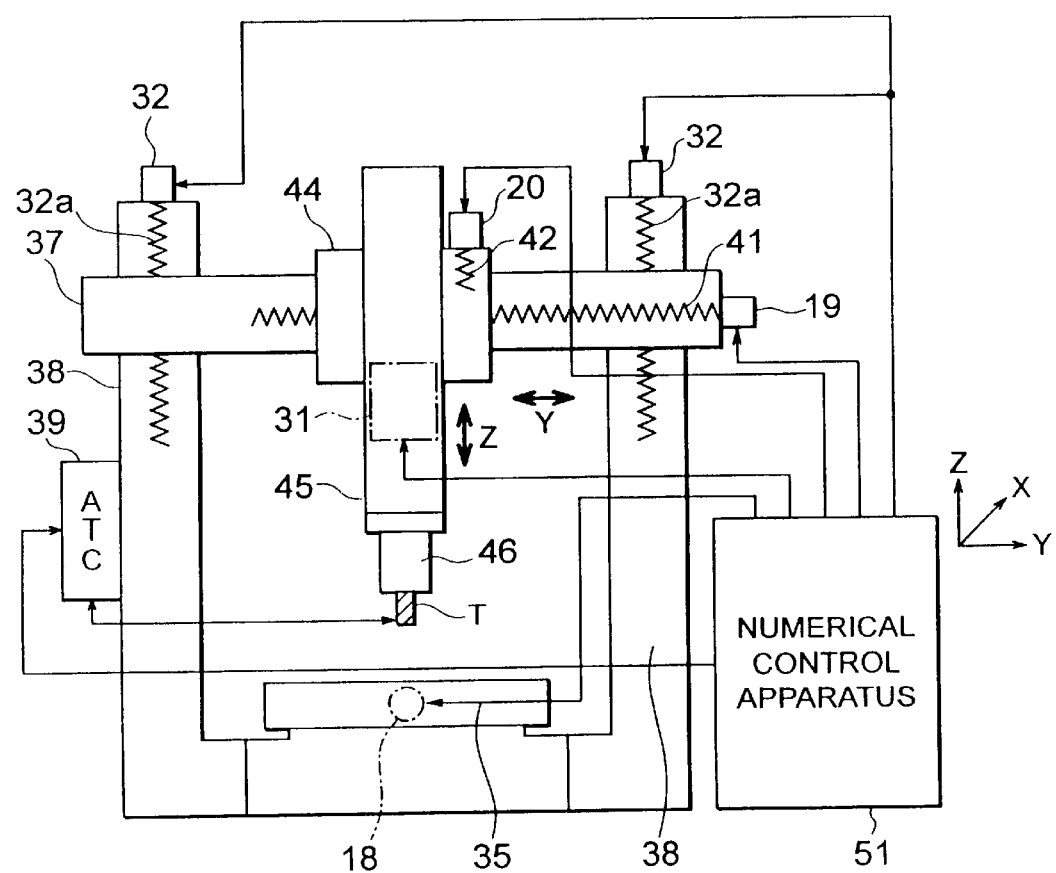
FIG. 1 is a view of the configuration of a machining center as an example of a machine tool according to the present invention.

Below, an explanation will be made of embodiments of the present invention by referring to the drawings.

First Embodiment

FIG. 1 is a view of the configuration of a machining center as an example of a machine tool according to the present invention. Note that the machining center is a numerical control machine tool capable of so-called combined machining.

In FIG. 1, the machining center 1 is provided with a cross rail 37 having two ends movably supported by shafts of a double housing type column 38. A ram 45 is provided movably in a vertical direction (Z-axis direction) via a saddle 44 supported movably on this cross rail 37.

The saddle 44 is provided with a not illustrated nut part passing thorough the cross rail 37 in a horizontal direction. A feed shaft 41 with a screw part formed on the outer circumference is screwed into this nut part.

A servo motor 19 is connected with an end of the feed shaft 41. The feed shaft 41 is driven to rotate by the servo motor 19.

By the rotation of the feed shaft 41, the saddle 44 moves in the Y-axis direction. By this, the ram 45 is moved and positioned in the Y-axis direction.

Further, the saddle 44 is provided with a not illustrated nut part in the vertical direction. The feed shaft 42 with a screw part formed on the outer circumference is screwed into this nut part. A servo motor 20 is connected with an end of the shaft 42.

The servo motor 20 drives the feed shaft 42 to rotate. By this, the ram 45 movably provided on the saddle 44 is moved and positioned in the Z-axis direction.

The ram 45 has built into it a spindle motor 31. This spindle motor 31 rotates a spindle 46 rotatably supported by the ram 45. A tool T such as an end mill is attached at the front end of the spindle 46. The tool is driven by the rotation of the spindle 46.

Below the ram 45, a table 35 is provided movably in the X-axis direction. The table 35 is provided with a not illustrated nut part. A not illustrated nut feed shaft provided along the X-axis direction is screwed into this nut part. This not illustrated feed shaft is connected to the servo motor 20.

The table 35 is moved and positioned in the X-axis direction by the rotation and driving of the servo motor 18.

Further, the double housing column 38 is provided with a not illustrated nut part. The cross rail 37 is raised and lowered by the rotation of the feed shaft 32a screwed into it by a cross rail elevation motor 32.

An automatic tool changer (ATC) 39 automatically changes the tool T attached to the spindle 46.

That is, the automatic tool changer 39 holds various tools in its not illustrated magazine, returns the tool T attached to the spindle by a not illustrated tool changing arm into the magazine, and attaches a required tool held by the magazine to the spindle by the tool changing arm.

A numerical control apparatus 51 drives and controls the above servo motors 18, 19, and 20, the cross rail elevation motor 32, and the spindle motor 31.

Specifically, the numerical control apparatus 51 controls the positions and the speeds between a workpiece and the tool T by the servo motor 18, 19, and 20 according to a machining process defined in advance in a machining program. Further, the numerical control apparatus 51 controls the rotational speed of the spindle 46 by decoding the rotational speed of the spindle 46 defined by an S-code in the machining program.

Still further, the numerical control apparatus 51 automatically changes various tools by decoding the tool changing operation of the tool T defined by for example an M-code in the machining program.

Figure 2:
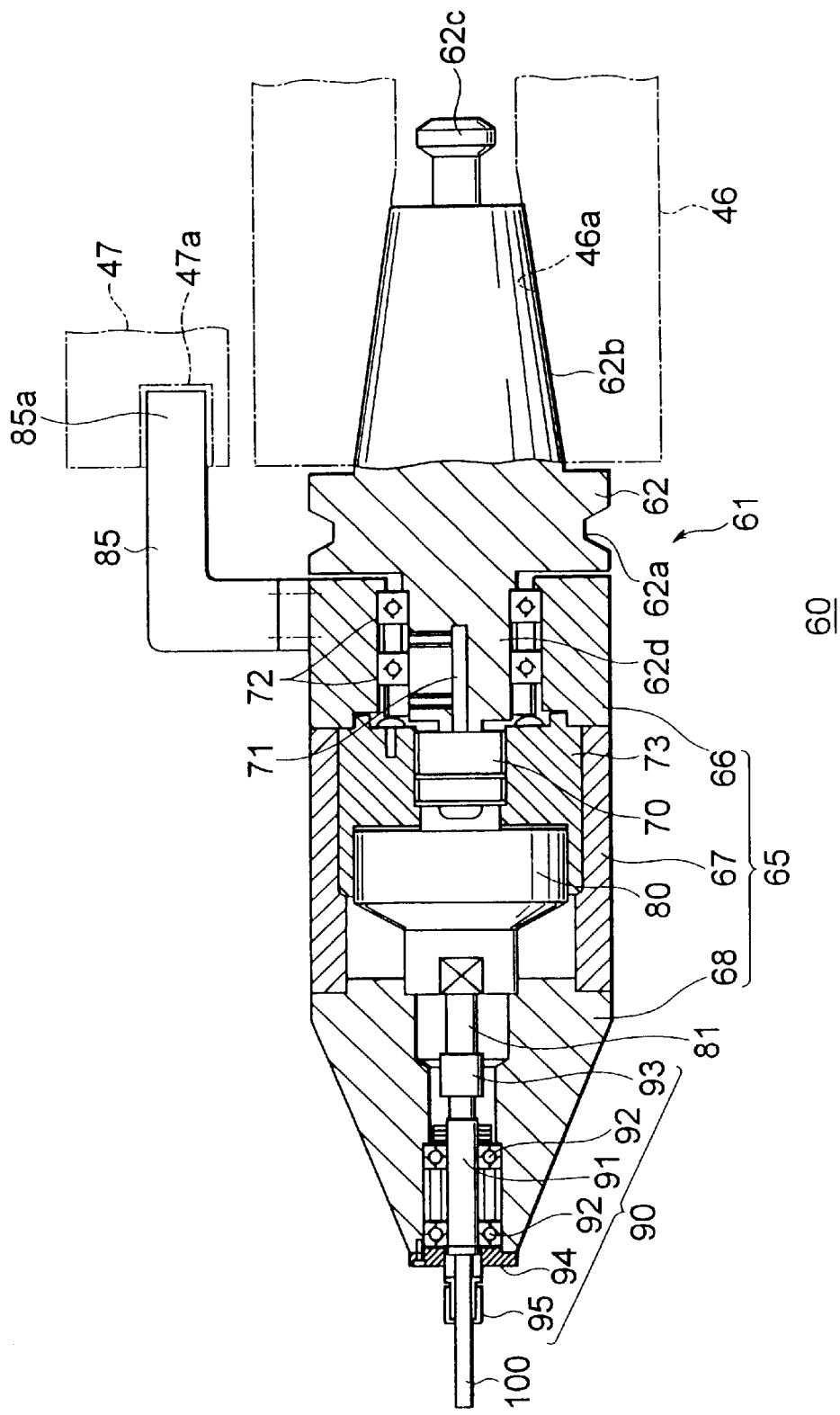
FIG. 2 is a sectional view of a tool according to the first embodiment of the present invention.

FIG. 2 is a sectional view of a tool according to the first embodiment of the present invention.

In FIG. 2, a tool 60 is comprised of a cutting tool 100 and a tool holder 61. Note that the cutting tool 100 is an embodiment of a machining tool according to the present invention.

The tool holder 61 has an attachment part 62, a casing 65 comprised of casing parts 66, 67, and 68, a generator 70, an electric motor 80, a tool holding part 90, and a locking part 85.

The attachment part 62 is provided with a grip part 62a, a taper shank 62b to be attached to a taper sleeve 46a formed at the front end of the above spindle 46, a pull stud 62c formed at the front end of this taper shank 62b, and a shaft portion 62d rotatably held by the casing part 66.

The grip part 62a of the attachment part 62 is gripped by the above tool changing arm of the automatic tool changer 39 when the tool 60 is being attached to the spindle 46 from the magazine of the automatic tool changer 39 and when the tool 60 is being conveyed from the spindle to the magazine of the automatic tool changer 39.

The center of the taper shank 62b of the attachment part 62 becomes concentric with the center of the spindle 46 by being attached to the taper sleeve 46a of the spindle 46.

The pull stud 62c of the attachment part 62 is clamped by a collet of a not illustrated clamping mechanism built in the spindle 46 when the attachment part 62 is attached to the taper sleeve 46a of the spindle 46. Note that the clamping mechanism built in the spindle 46 is well known, so a detailed explanation of it will be omitted.

The shaft portion 62d of the attachment part 62 is supported rotatably held by the inner circumference of the casing part 66 via a plurality of bearings 72.

The shaft portion 62d of the attachment part 62 is connected with the input shaft 71 of the generator 70. As this generator 70, for example, a three-phase synchronous generator can be used.

The electric power generated by the generator 70 is supplied to the electric motor 80. As this electric motor 80, for example, a three-phase induction motor can be used.

Figure 3:
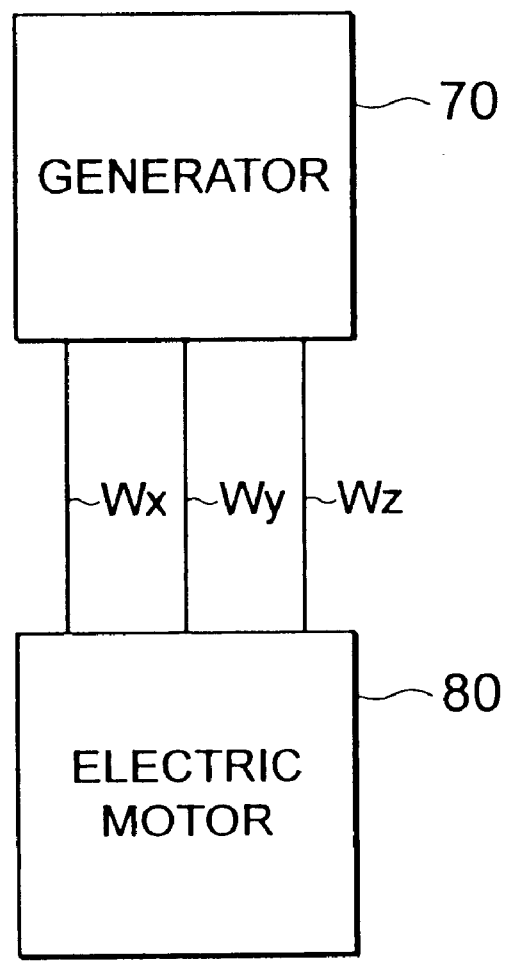
FIG. 3 is a view of the connection state of a motor and generator.

For example, in a case where a three-phase synchronous generator is used as the generator 70 and a three-phase induction motor is used as the electric motor 80, as shown in FIG. 3, the generator 70 and the electric motor 80 are connected by three power cables Wx, WY, and Wz. The electric motor 80 receives a supply of three-phase alternating current generated by the generator 70 through the three power cables.

The tool holding part 90 has a rotatable shaft 91, a coupling 93 for connecting this rotatable shaft 91 and the output shaft 81 of the electric motor 80, and a tool attachment part 95.

The rotatable shaft 91 is rotatably held by the inner circumference of the casing part 68 via a plurality of rolling bearings 72.

The front end side of the rotatable shaft 91 is prevented from detaching from the casing part 68 by a stopper 94.

The cutting tool 100 is held by the tool attachment part 95. This cutting tool 100 machines a workpiece.

Specifically, as the cutting tool 100, a cutting tool such as a drill or an end mill may be used.

The casing parts 66, 67, and 68 are connected each other by clamping means such as bolts. The casing 65 is constructed by these casing parts 66, 67, and 68.

A locking part 85 is mounted on the outer circumference of the casing part 66.

When the attachment part 62 is attached to the taper sleeve 46a of the spindle 46, the front end of the locking part 85 is inserted to an engagement hole 47a formed at a non-rotating part such as the ram 45 on the side of the spindle 46.

Due to this, even if the spindle 46 is rotated, rotation of the casing 65 is prevented.

Next, an explanation will be made of an example of the operation of the above configured tool 60.

First, the automatic tool changer 39 attaches the tool holder 61 holding the cutting tool 100 at the tool attachment holder 95 to the spindle 46 of the machining center 1. The front end 85a of the locking part 85 is inserted into the engagement hole 47a of the non-rotating part 47 whereby the rotation of the casing 65 is prevented.

By rotating the spindle at the rotational speed of $N_0$ from this state, the attachment part 62 of the tool holder 61 is rotated, and the rotation of the spindle 46 is transmitted to the generator 70. By this, the generator 70 generates electric power. In the case of a three-phase synchronous generator as the generator 70, the generator 70 generates three-phase alternating current.

The frequency F of the three-phase alternating current generated by the generator 70, as the pole number of the generator 70 is $p_1$ and the rotational speed of the spindle 46 is $N_0$ [rpm], is expressed by the following formula (1).

$$F = P_1 * N_0 / 120 [\text{Hz}] \qquad (1)$$

Accordingly, when the spindle 46 is rotated at the rotational speed $N_0$, a three-phase alternating current having the frequency F expressed the above formula (1) is supplied to the electric motor 80.

Here, in case where a three-phase induction motor is used as the electric motor 80, as the pole number of the electric motor 80 is $p_2$, the electric motor 80 is rotated by $2/p_2$ per cycle of the three-phase alternating current.

Therefore, the synchronous rotational speed of the electric motor 80 is expressed by the following formula (2).

$$N_1 = 120 * F / p_2 \qquad (2)$$

Accordingly, the relationship of the rotational speed $N_1$ of the cutting tool 100 to the rotational speed $N_0$ of the spindle 46 is expressed by the following formula (3).

$$N_1 = N_0 * p_1 / p_2 [\text{rpm}] \qquad (3)$$

As understood from formula (3), the rotational speed $N_0$ of the spindle 46 is changed to the rotational speed $N_1$ expressed by the above formula (3).

As expressed by the formula (3), it is found that by appropriately setting the ratio between the pole number $p_1$ of the generator 70 and the pole number $p_2$ of the electric motor 80, it is possible to freely set the ratio of the rotational speed of the cutting tool 100 to the rotational speed of the spindle 46.

That is, in the case where it is intended to raise the rotational speed of the cutting tool 100 higher than that of the spindle 46, the ratio of the pole number $p_1/p_2$ is set larger than 1. When it is intended to reduce the rotational speed of the cutting tool 100 to lower than that of the spindle 46, the ratio of the pole number $p_1/p_2$ is set smaller than 1.

Next, an explanation of the driving method of the above configured tool will be made.

When machining a workpiece comprised of a difficult-to-cut material such as aluminum alloy, sometimes the rotational speed of the cutting tool 100 is raised higher than the maximum rotational speed of the spindle 46.

In such a case, the tool 60 is held in advance in the magazine of the automatic tool changer 39 of the machining center 1.

For example, when the maximum rotational speed Nmax of the spindle 46 of the above machining center 1 is 3000 rpm and the rotational speed of the cutting tool 100 is raised to 30,000 rpm, the generator 70 and the electric motor 80 having a ratio of the pole number $p_1/p_2$ of 10 are used.

The automatic tool changer 39 attaches the tool 60 automatically to the spindle 46 in the same way as an ordinary tool. Note that an ordinary tool is a tool having a cutting tool clamped by a tool holder.

The rotational speed of the cutting tool 100 held by the tool holder 61 is controlled by the rotational speed of the spindle 46. Specifically, in the machining program downloaded in the numerical control apparatus 51, the rotational speed of the spindle 46 is designated in advance by an S-code in accordance with the rotational speed of the cutting tool 100 held by the tool holder 61. For example, when rotating the cutting tool 100 at the rotational speed of 30,000 rpm, the rotational speed of the spindle 46 is designated as 3000 rpm by the S-code in the machining program.

When the spindle 46 is rotated at the rotational speed of 3000 rpm, the generator 70 generates a three-phase alternating current having a frequency in accordance with the rotational speed of the spindle 46 and the pole number of the generator 70 and electric motor 80.

The electric motor 80 is driven by the three-phase alternating current supplied from the generator 70, while the cutting tool 100 held by the tool holder 61 is rotated at the rotational speed of about 30,000 rpm.

In the above state where the rotational speed of the cutting tool 100 is increased, by moving the workpiece fixed on the table 35 relative to the cutting tool 100 (spindle 46) in accordance with the machining program, the workpiece is cut.

By this, it becomes possible to appropriately cut a workpiece comprised of a difficult-to-cut material such as aluminum alloy.

In this way, according to the present embodiment, the rotational speed of the cutting tool 100 is raised by driving the motor 80 by the electric power generated by the generator 70. Due to this, even if the spindle 46 is rotated at a high rotational speed, heat is not increasingly generated such as in a gear apparatus, so a reduction of the machining tolerance due to the heat can be avoided.

Further, in this embodiment, the rotational speed of the cutting tool 100 is changed by using the generator 70 and electric motor 80. Therefore, it is possible to decrease the cost and noise of the tool 60 compared with the case using a transmission mechanism such as a gear apparatus.

Further, according to this embodiment, the tool 60 can be attached to the spindle 46 and changed by the automatic tool changer 39 in the same way as an ordinary tool. Due to this, it is possible to immediately respond to a need for high speed rotation of the cutting tool 100.

Further, according to this embodiment, the cutting tool 100 is driven by the electric power generated by the rotation of the spindle 46. For this reason, it is not necessary to supply electric power from outside of the tool, so a cable for supplying electric power is not necessary between the spindle 46 and the tool 60.

Further, in this embodiment, a three-phase synchronous generator is used as the generator 70 and a three-phase induction motor is used as the electric motor 80. Due to this, it becomes possible to easily control the rotational speed of the cutting tool 100 by the rotational speed of the spindle 46. That is, since the three-phase synchronous generator generates voltage having a frequency precisely proportional to the rotational speed of the spindle 46 and since the three-phase induction motor drives the cutting tool 100 at a rotational speed proportional to this frequency, the rotational speed of the cutting tool 100 can be easily and precisely controlled by the rotational speed of the spindle 46 and the pole number ratio between the three-phase synchronous generator and the three-phase induction motor.

Further, no position detecting element for detecting the rotational position of a rotor is needed for the electric motor 80. Due to this, no cable is needed between the numerical control apparatus 51 and the tool holder 51, so complete separation of the tool 60 from the spindle 46 becomes possible.

Note that in the above embodiment, the explanation was made of the case of application to high speed machining of an aluminum alloy, but the present invention can be applied to any machining requiring acceleration of the rotational speed of the spindle 46. For example, the present invention can be applied to machining of various super difficult-to-cut materials such as cemented carbide, silicate glass, and ceramics.

Further, in the above embodiment, the explanation was made of the case of increasing the rotational speed of the cutting tool 100 from the rotational speed of the spindle 46, but decreasing the rotational speed of the cutting tool 100 from the rotational speed of the spindle 46 is also possible.

Further, in the above embodiment, the explanation was made of the case of use of a three-phase synchronous generator as the generator 70 and use of a three-phase induction motor as the electric motor 80, but it is also possible to employ a configuration changing the rotational speed of the spindle 46 by a combination of a direct current generator and a direct current motor. The rotational speed of the direct current motor is determined by voltage supplied from the direct current generator and the load. For this reason, it is difficult to directly control the rotational speed of the cutting tool 100 by the rotational speed of the spindle 46.

By measuring the output characteristic and the load characteristic of the direct current generator and the direct current motor in advance, it becomes possible to change the rotational speed of the spindle 46 at a constant speed ratio by the combination of the direct current generator and the direct current motor.

Further, it is possible to use another kind of generator and motor.

Second Embodiment

Figure 4:
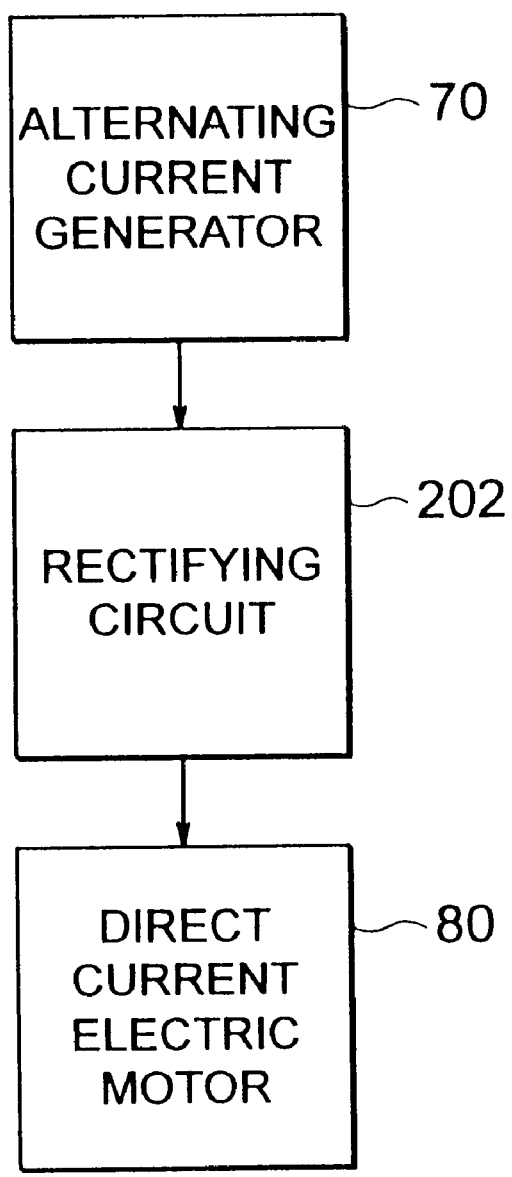
FIG. 4 is a view of the configuration of an electrical system of a tool according to a second embodiment of the present invention.

FIG. 4 is a view of the configuration of the electrical system of a tool according to a second embodiment of the present invention. Note that the mechanical structure of the tool according to the present embodiment is the same as the above mentioned embodiment.

As shown in FIG. 4, the tool according to the present embodiment is provided with an alternating current generator as the generator 70, a direct current motor as the electric motor 80, and a rectifier circuit 201.

The rectifier circuit 201 rectifies alternating current generated by the generator 70 and supplies it to the electric motor 80. This rectifier circuit 201 is built in, for example, the above casing 65.

The amount of the direct current supplied from the rectifier circuit 201 is defined by the rotational speed of the spindle 46. On the other hand, the rotational speed of the direct current motor can be controlled in accordance with the amount of the supplied current. Accordingly, by controlling the rotational speed of the spindle 46, control of the speed of the electric motor 80 becomes possible.

In this way, according to the present invention, even if an alternating current generator is used as the generator 70 and a direct current motor is used as the electric motor 80, by providing the rectifier circuit 201 at the tool, it is possible to change the rotational speed of the cutting tool 100 from the rotational speed of the spindle 46.

Note that in the above embodiment, a configuration where the rectifier circuit 201 was built in the casing 65 was employed, but it is also possible to employ a configuration where the rectifier circuit 201 is housed in a box or the like and this is attached to the outside of the casing 65.

Further, it is also possible to employ a configuration where a cavity is formed at the casing 65 and the cavity houses the rectifier circuit 201.

Third Embodiment

Figure 5:
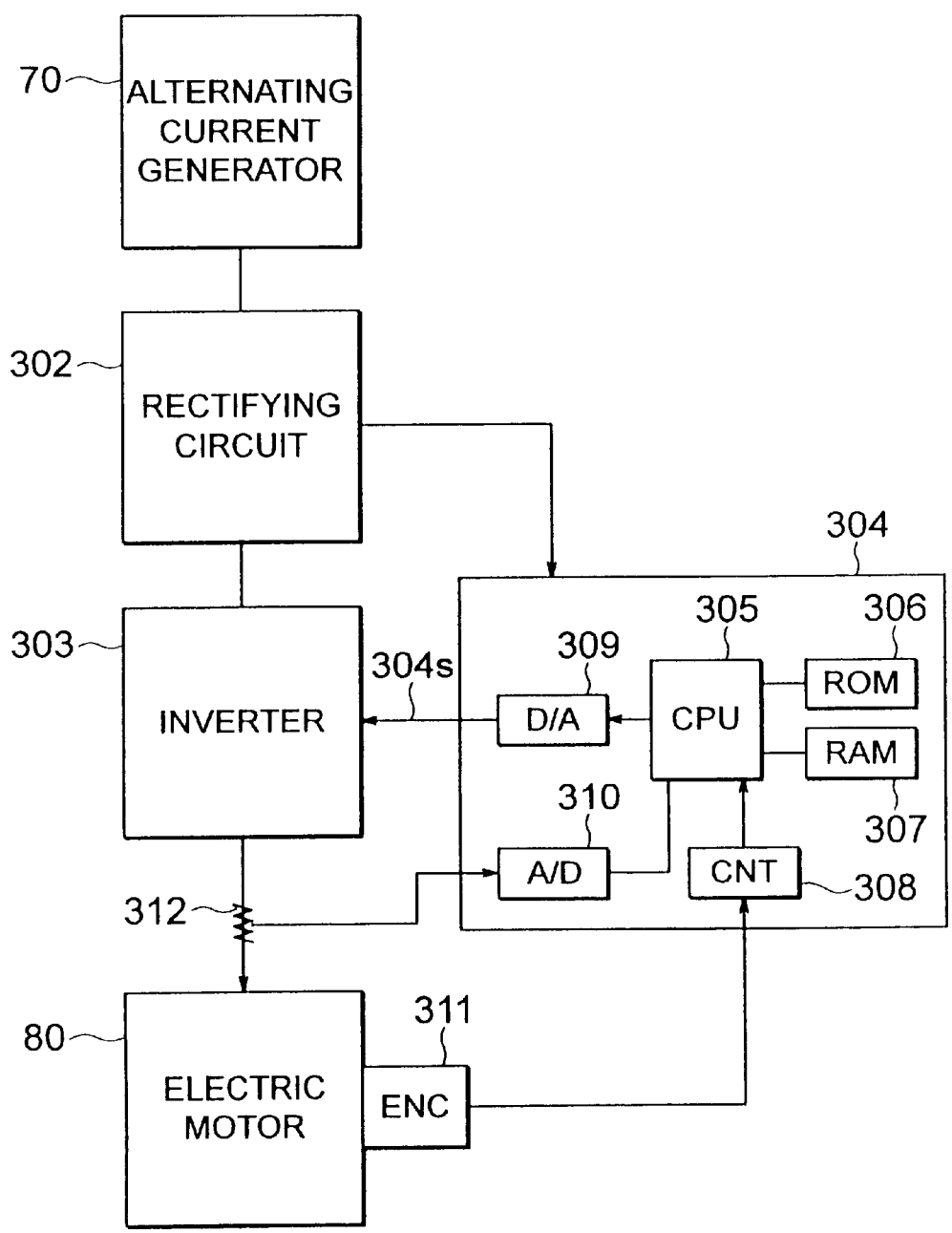
FIG. 5 is a view of the configuration of an electrical system of a tool according to a third embodiment of the present invention.

FIG. 5 is a view of the configuration of the electrical system of a tool according to a third embodiment of the present invention. Note that the mechanical structure of the tool according to the present embodiment is the same as the above mentioned first embodiment.

In the above first and second embodiments, the rotational speed of the cutting tool 100 of the tool 60 is controlled by the rotational speed of the spindle 60, namely, the input rotational speed of the generator 70.

In the present embodiment, an explanation will be made of a configuration enabling control of the rotational speed of the cutting tool 100 regardless of the input rotational speed of the generator 70.

As shown in FIG. 5, the tool according to the present embodiment is provided with a generator 70 comprised of an alternating current generator, an electric motor 80, a rectifier circuit 302, an inverter 303, and a control circuit 304.

The rectifier circuit 302, the inverter 303, and the control circuit 304 are incorporated in the above casing 65. Note that it is possible to employ a configuration where at least some of these rectifier circuit 302, inverter 303, and control circuit 304 are housed in a box mounted on the outside of the casing 65.

Further, it is also possible to employ a configuration where a cavity is formed on the casing 65 and the cavity houses these rectifier circuit 302, inverter 303, and control circuit 304.

Further, the rectifier circuit 302 supplies part of the rectified direct current to the control circuit 304.

The inverter 303 changes the direct current supplied from the rectifier circuit 302 into alternating current for driving the electric motor 80. For example, the inverter 303 is configured by a pulse width modulation(PWM) inverter.

The control circuit 304 is provided with a microprocessor 305, a read only memory (ROM) 306, a random access memory (RAM) 307, a counter circuit 308, an analog-to-digital (A/D) converter 310, and a digital-to-analog (D/A) converter 309.

The ROM 306 stores a control program for controlling the electric motor 80. The control program performs for example variable speed control of the electric motor 80 by field-oriented control.

The RAM 307 stores data for operations of the microprocessor 305.

The microprocessor 305 executes the control program stored in the ROM 306, performs various operations, and outputs control signals 304s to the inverter 300 via the D/A converter 309. The control signals 304s are for example PWM control signals.

The A/D converter 310 converts the value of the current supplied from the inverter 303 to the electric motor 80 detected by a current detector 312 into a digital signal.

The electric motor 80 is provided with a rotational position detector 311. As this rotational position detector 311, for example, an optical rotary encoder or a resolver may be used.

The counter circuit 308 counts pulse signals detected by the rotational position detector 311 in accordance with the rotation of the electric motor 80 and outputs the count to the microprocessor 305.

The above configured control circuit 304 can operate by receiving electric power generated by the generator 70 by the rotation of the spindle 46.

The control circuit 304 receives the rotation and the drive current of the electric motor 80 as input. Due to this, by preparing a desired control program in the ROM 306 of the control circuit 304 in advance, various control of the electric motor 80 becomes possible.

For example, when a synchronous motor is used as the electric motor 80 and it is intended to variably control the speed of this synchronous motor, velocity reference data is set in advance in the ROM 306. By this, speed control of the electric motor 80 becomes possible in accordance with this velocity reference data.

Accordingly, according to the present embodiment, control of the rotational position, the rotational speed, and the torque of the cutting tool 100 becomes possible regardless of the rotational speed of the spindle 46. That is, in the present embodiment, it becomes possible to drive and control the cutting tool 100 separately at the tool side.

Fourth Embodiment

Figure 6:
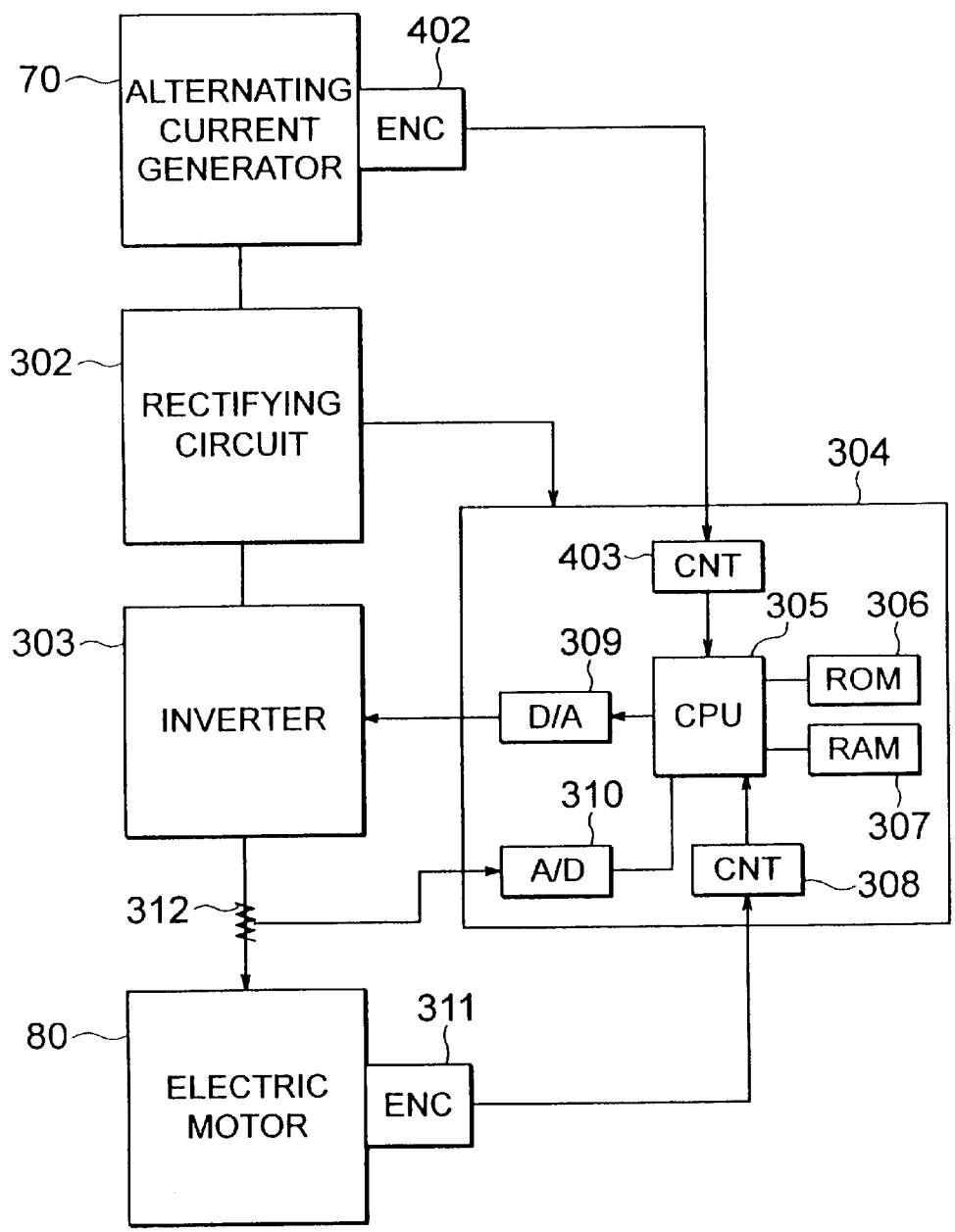
FIG. 6 is a view of the configuration of an electrical system of a tool according to a fourth embodiment of the present invention.

FIG. 6 is a view of the configuration of the electrical system of a tool according to a fourth embodiment of the present invention. Note that the mechanical structure of the tool according to the present embodiment is the same as the above mentioned first embodiment.

The point of difference between the configuration of the present embodiment and the configuration explained in the third embodiment is that the generator 70 is provided with a rotational position detector 402 and the signal detected by this rotational position detector 402 is input to the microprocessor 305 via a counter circuit 403. The rest of the configuration of the present embodiment is exactly the same as that of the third embodiment.

The rotational position detector 402 is mounted to the input shaft 71 of the generator 70 and detects the rotation of the input shaft 71. As the rotational position detector 402, for example, an optical rotary encoder or a resolver may be used.

By detecting the amount of rotation of the input shaft 71 by the rotational position detector 402, the rotation of the spindle 46 is input to the control circuit 304.

In the control circuit 304, by calculating the difference per unit time of the rotation received from the counter circuit 403, it becomes possible to determine the rotational speed of the spindle 46.

Accordingly, by preparing in advance a program for generating velocity references having a constant speed ratio to the rotational speed of the spindle 46 in the ROM 306, it becomes possible to accurately control the rotational speed of the electric motor 80 with respect to that of the spindle 46. That is, by employing the configuration of the present embodiment, it becomes possible to accurately control the rotational speed of the spindle 46 in the same way as a gear apparatus.

Further, in the control circuit 304, both of the rotational position of the spindle 46 and the rotational position of the electric motor 80 can be obtained, so it becomes possible to make the rotational position of the spindle 46 and the rotational position of the electric motor 80 exactly match.

Fifth Embodiment

Figure 7:
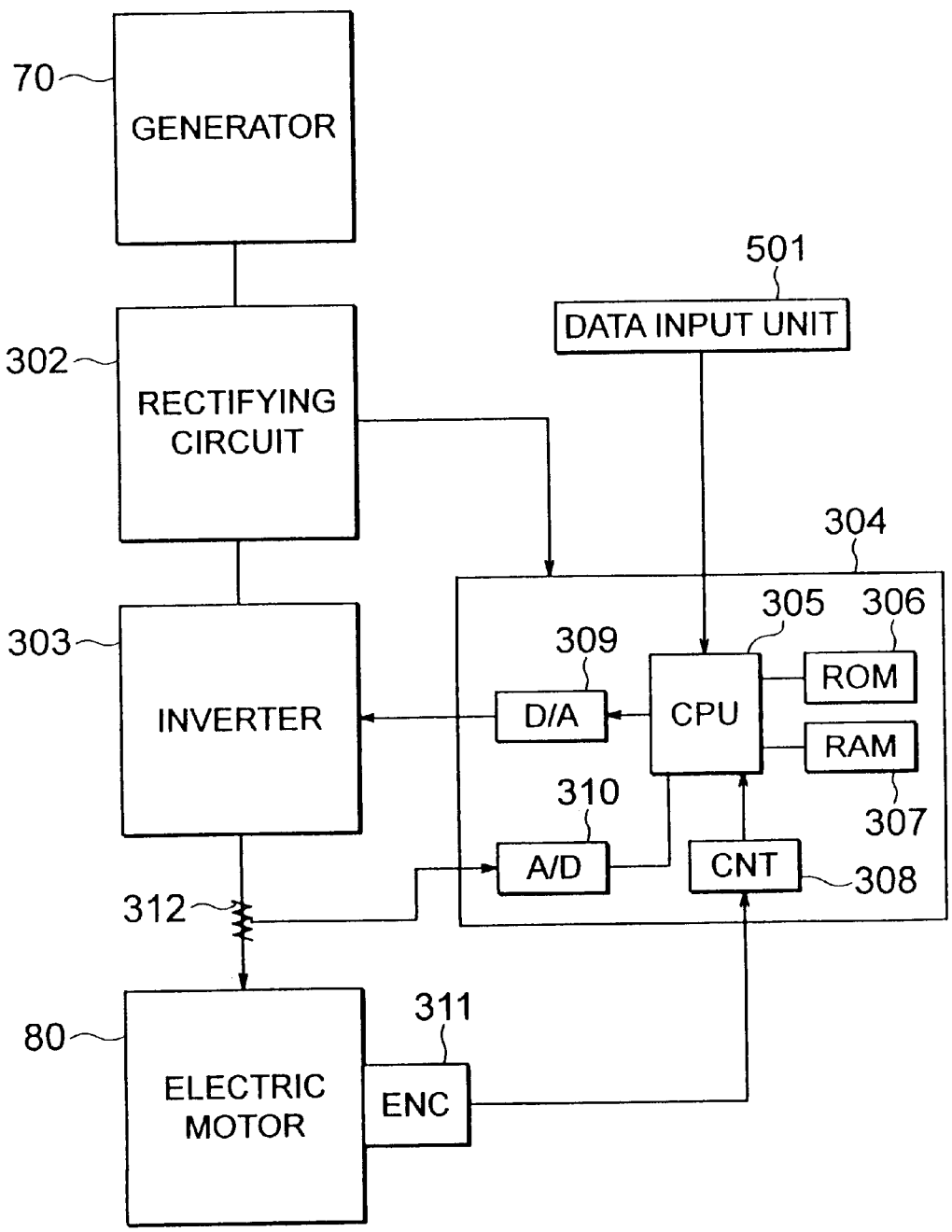
FIG. 7 is a view of the configuration of an electrical system of a tool according to a fifth embodiment of the present invention.

FIG. 7 is a view of a configuration of the electrical system of a tool according to a fifth embodiment of the present invention.

Note that the mechanical structure of the tool according to the present embodiment is the same as the above mentioned first embodiment.

The point of difference between the configuration of the present embodiment shown in FIG. 7 and the configuration explained in the third embodiment is that a data input unit 501 is added to the control circuit 304. The rest of the configuration of the present embodiment is exactly the same as that of the third embodiment.

The data input unit 501 inputs various types of data for controlling the electric motor 80 from the outside to the control circuit 304.

Specifically, the data input unit 501 can be configured by switches mounted on the casing 65 which are operable from outside the casing 65.

The data input unit 501 can be also configured by a receiving apparatus mounted on the outside of the casing 65 for receiving wireless signals. According to this configuration, it becomes possible to input data in real time while machining by the tool.

The data input from the data input unit 501 includes for example various types of data such as velocity references to the electric motor 80 or control parameters.

In the present embodiment, by employing the above configuration, it is possible to freely change the content of the control of the electric motor 80. For example, when machining conditions are changed, it becomes possible to easily change the rotational speed of the electric motor 80.

Sixth Embodiment

Figure 8:
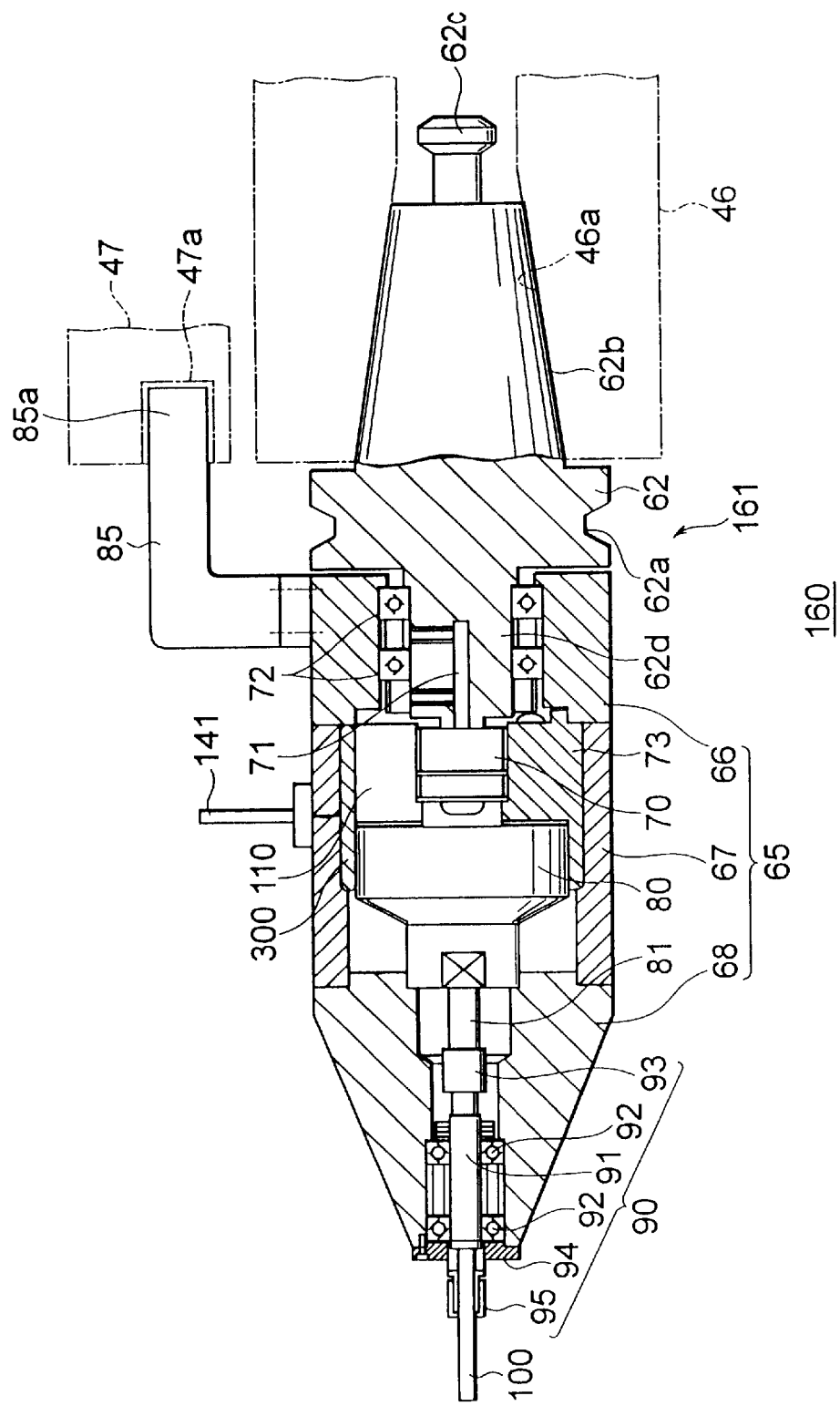
FIG. 8 is a sectional view of a tool according to a sixth embodiment of the present invention.

FIG. 8 is a sectional view of a tool according a sixth embodiment of the present invention. Note that in FIG. 8, parts corresponding to those in the tool 60 according to the first embodiment are assigned the same reference numerals.

The tool 160 shown in FIG. 8 is configured from the cutting tool 100 and a tool holder 161.

The tool holder 161 is provided with a secondary battery 110, a processing board 300, and an antenna 141 in addition to the attachment part 62, the casing 65, the generator 70, the electric motor 80, the tool holding part 90, and the locking part 85.

The secondary battery 110 is fixed inside of the casing part 67. This secondary battery 110 stores part of the electric power generated by the generator 70. As the secondary battery 110, for example, a nickel-cadmium battery may be used. Besides this, a nickel-hydrogen battery, a lithium battery, or a small-sized lead storage battery can be also used.

The antenna 141 is fixed on the outside surface of the casing part 65.

The processing board 300 is fixed inside of the casing 65. This processing board 300 is electrically connected with the secondary battery 110 and antenna 141.

Figure 9:
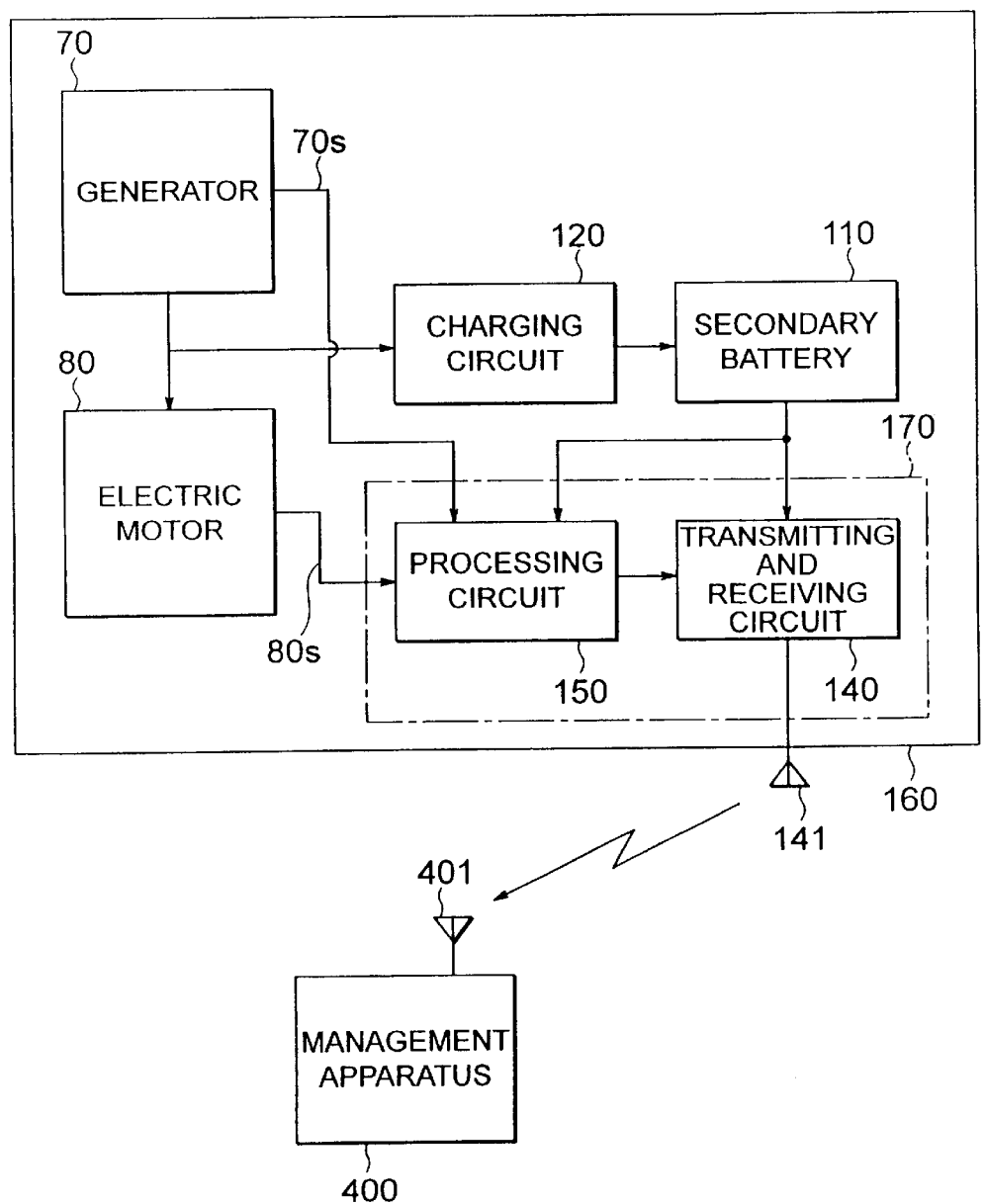
FIG. 9 is a view of the configuration of an electrical system of a tool and the configuration of a tool management system using the same according to the sixth embodiment of the present invention.

FIG. 9 is a view of the configuration of the electrical system of the tool and the configuration of the tool management system according to the sixth embodiment of the present invention.

In FIG. 9, the tool 160 is provided with a charging circuit 120, a processing circuit 150, and a transmitting and receiving circuit 140 in addition to the above generator 70, the electric motor 80, the secondary battery 110, and the antenna 141.

Further, the tool management system according to the present embodiment is comprised of the tool 160 and a management apparatus 400.

The charging circuit 120, the processing circuit 150, and the transmitting and receiving circuit 140 are formed on the above processing board 300. The charging circuit 120 charges the secondary battery 110 with a part of the electric power generated by the generator 70. This charging circuit 120 is comprised of a rectifier circuit for rectifying the alternating voltage generated by the generator 70, a smoothing circuit for smoothing the ripple included in the output voltage of this rectifier circuit and converting it into appropriate voltage, etc.

The secondary battery 110 supplies the electric power charged by the charging circuit 120 to the power receiving part 170 having the processing circuit 150 and the transmitting circuit 150.

The processing circuit 150 operates by receiving the electric power supplied from the secondary battery 110 and processes information related to the machining of a workpiece by the cutting tool 100.

Here, the information related to the machining of a workpiece by the cutting tool 100 includes, for example, tool information of a predetermined format for identifying the tool 160, monitor information concerning the rotational state of the generator 70 or the electric motor 80 during machining, etc. Further, the information related to the machining of a workpiece by the cutting tool 100 also includes information about the detected rotational position and the detected rotational speed of the electric motor 80.

The tool information includes for example information about the type of the cutting tool 100 such as drill or end mill, size of the cutting tool 100 such as diameter or length, etc.

The monitor information includes information about disconnection or short-circuits of cables in the generator 70 or the electric motor 80, overload of the electric motor 80, etc.

The processing circuit 150 first generates the above tool information of the predetermined format. Further, the processing circuit 150 detects the generated current 70s of the generator 70 or drive current 80s of the electric motor 80, monitors for an irregular state of the generator 70 or the electric motor 80 based on the detected information, adds this monitor information to the tool information, and transmits this tool information to the transmitting and receiving circuit 140.

The transmitting and receiving circuit 140 transmits the data from the processing circuit 150 to the management apparatus 400 as a wireless signal by the antenna 141.

The charging circuit 120, the processing circuit 150, and the transmitting and receiving circuit 140 can be incorporated in the casing 65. Note that it is also possible to house the processing circuit 150 and the transmitting and receiving circuit 140 in a box and mount the box to the outside of the casing 65. Further, it is also possible to employ a configuration where a cavity is formed on the casing 65 and the charging circuit 120 and the processing circuit 150 and the transmitting and receiving circuit 140 are housed in the cavity.

The management apparatus 400 is provided with an antenna 401 which receives data from the antenna 141. This management apparatus 400 is provided with a utility program for monitoring and managing the tool 160 based on the data from the antenna 141. Note that the management apparatus 400 is configured by for example a personal computer.

Figure 10:
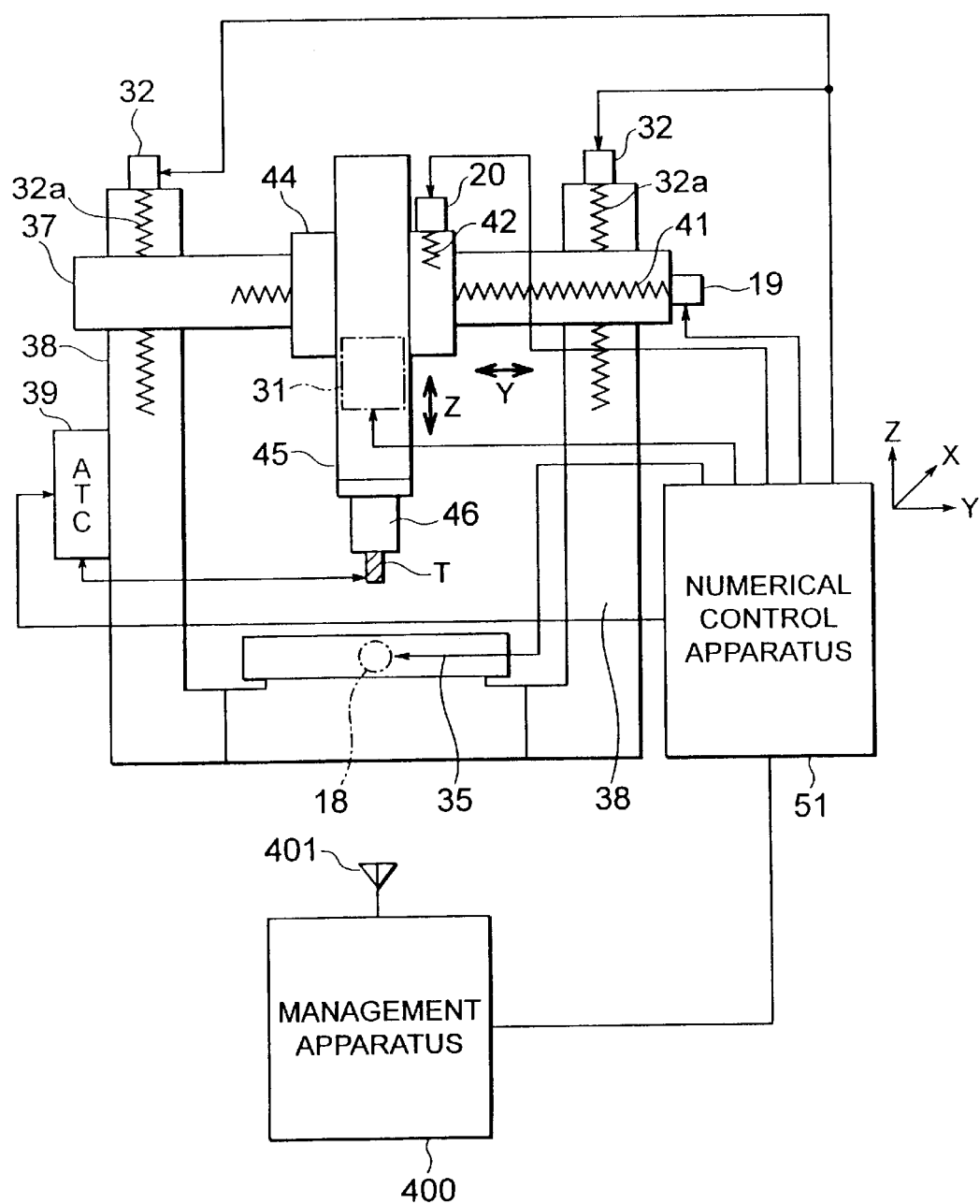
FIG. 10 is a view of the configuration of a machine tool to which the tool management system is applied.

Further, as shown in FIG. 10, the management apparatus 400 is connected to the numerical control apparatus 51. In a case of an irregular state such as a fault in the tool 160, the management apparatus 400 transmits this irregular state information to the numerical control apparatus 51.

Next, an explanation will be given of an example of the operation of the above configured tool 160.

The automatic tool changer 39 attaches the tool holder 161 holding the cutting tool 100 to the spindle 46 of the machining center 1. The front end 85a of the locking part 85 is inserted into the engagement hole 47a of the non-rotating part 47, whereby rotation of the casing 65 is prevented.

When the spindle 46 is rotated at predetermined rotational speed from this state, the attachment part 62 of the tool holder 161 is rotated, so the rotation of the spindle 46 is transmitted to the generator 70.

For example, in case where a three-phase synchronous is used as the generator 70, three-phase alternating current is generated.

A part of this three-phase alternating current is charged into the secondary battery 110 by the charging circuit 120.

The processing circuit 150 and the transmitting and receiving circuit 140 become operable by the charge of the secondary battery 110.

When the processing circuit 150 becomes operable, the processing circuit 150 generates the tool information of a predetermined format and transmits this tool information to the transmitting and receiving circuit 140.

The transmitting and receiving circuit 140 transmits the tool information of a predetermined format to the management apparatus 400.

When an irregular state of the generator 70 or the electrical motor 80 occurs while machining a workpiece by the cutting tool 100, irregular state information is transmitted to the management apparatus 400 in addition to the tool information.

Further, if the secondary battery is charged, even after the rotation of the spindle 46 stops, the processing circuit 150 and the transmitting and receiving circuit 140 can transmit various types of data such as tool information or irregular state information to the management apparatus 400.

For example, when the management apparatus 400 has obtained the irregular state information from the transmitting and receiving circuit 140, the management apparatus 400 transmits this irregular state information to the numerical control apparatus 51. When receiving the irregular state information, the numerical control apparatus 51 controls the automatic tool changer 39 so as to detach the tool 160 from the spindle 46.

According to the present embodiment, the tool 160 is provided with the secondary battery 110 and can use the electric power stored in this secondary battery 110 in the power receiving part 170 other than the electric motor 80. Due to this, it is possible to operate various circuits incorporated in or added to the tool 160 regardless of the rotation of the spindle 46, and it is possible to transmit and receive data even during stoppage of the spindle 46.

Further, according to the present embodiment, by the management apparatus 400 collecting information from the tool 160, comprehensive management of the tool 160 becomes possible.

Seventh Embodiment

Figure 11:
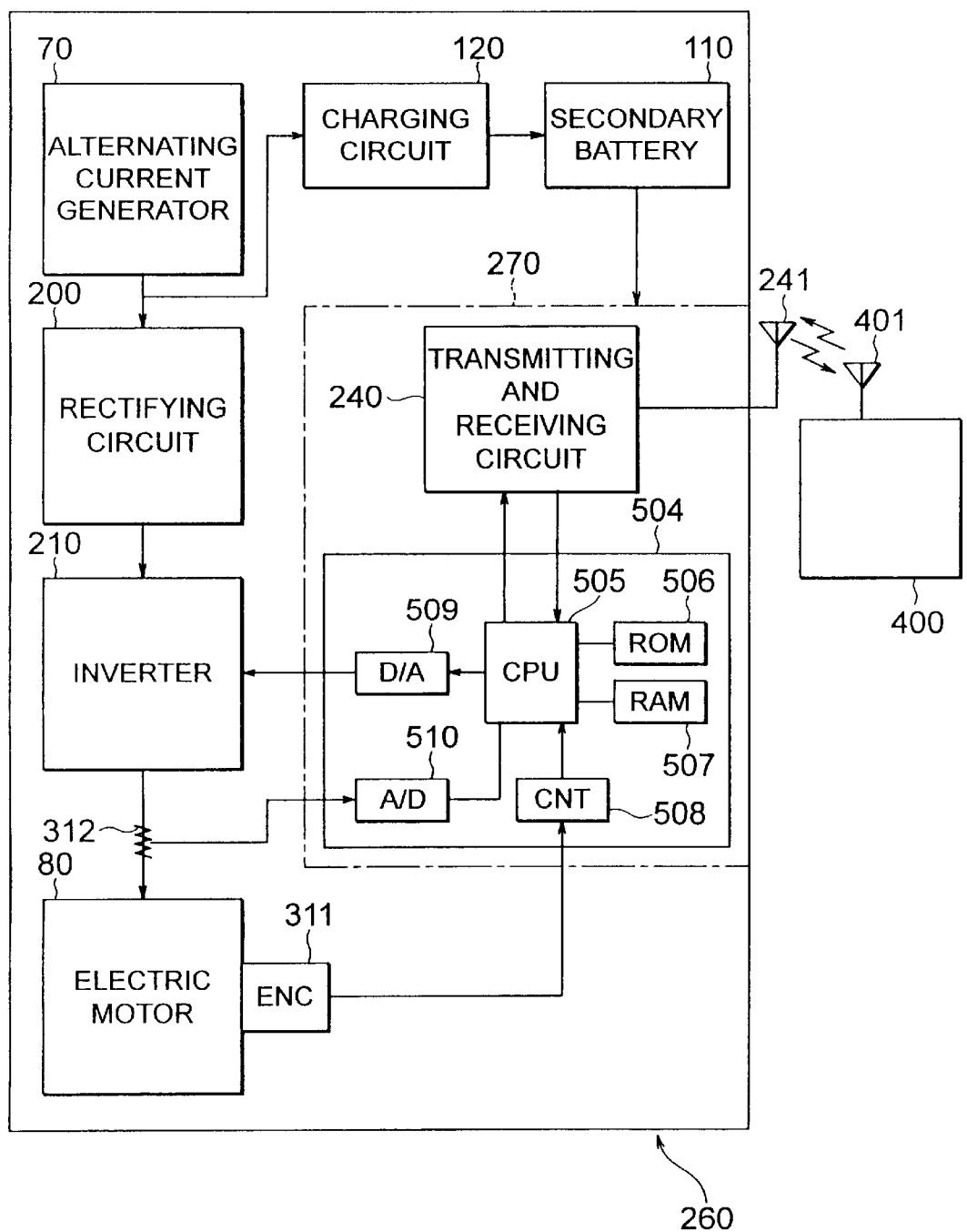
FIG. 11 is a view of the configuration of an electrical system of a tool and the configuration of a tool management system using the same according to a seventh embodiment of the present invention.

FIG. 11 is a view of the configuration of the electrical system of a tool and the configuration of a tool management system according to a seventh embodiment of the present invention.

Note that the mechanical structure of the tool according to the present embodiment is the same as the sixth embodiment. In FIG. 11, the parts corresponding to those in the tool 160 according to the sixth embodiment use the same reference numerals.

In the above sixth embodiment, the management apparatus 400 only received the data from the tool 160, but in the present embodiment, an explanation will be made of a configuration enabling transmission and reception of data between the management apparatus 400 and the tool 260.

As shown in FIG. 11, the tool 260 according to the present embodiment is provided with a rectifier circuit 200, an inverter 210, and a power receiving part 270 in addition to the generator 70 comprised of an alternating current generator, the electric motor 80 comprised of an induction rotor, the secondary battery 110, and the charging circuit 120.

Further, the rectifier circuit 200, the inverter 210, and the power receiving part 270 are housed in the casing 65. Note that it is possible to employ a configuration where at least some or these rectifier circuit 200, inverter 210, and power receiving part 270 are housed in a box mounted on the outside of the casing 65.

Further, it is also possible to employ a configuration where a cavity is formed in the casing 65, and the rectifier circuit 200, the inverter 210, and the power receiving part 270 are housed in the cavity.

The rectifier circuit 200 rectifies alternating current generated by the generator 70 and supplies it to the inverter 210.

The inverter 210 changes the supplied direct current from the rectifier circuit 200 to alternating current for driving the electric motor 80. For example, the inverter 210 is comprised of a PWM inverter.

The charging circuit 120 charges the secondary battery 110 with part of the electric power generated by the generator 70. This charging circuit 120 is comprised of a rectifier circuit for rectifying the alternating voltage generated by the generator 70, a smoothing circuit for smoothing the ripple included in the output of this rectifier circuit and converting it into appropriate voltage, etc.

The secondary battery 110 supplies the electric power charged by the charging circuit 120 to the electric power receiving part 270.

The electric power receiving part 270 is comprised of a processing circuit part 504 and the transmitting and receiving circuit 240 and is operated by electric power supplied from the secondary battery 110.

The transmitting and receiving circuit 240 transmits the data related to machining of a workpiece by the cutting tool 100 to the management apparatus 400 and receives data related to machining of a workpiece by the cutting tool 100 from the management apparatus 400 via an antenna 241.

The processing circuit part 504 processes the information related to machining of a workpiece by the cutting tool 100. This processing circuit part 504 is provided with a microprocessor 505, a read only memory (ROM) 506, a random access memory (RAM) 507, a counter circuit 508, an analog-to-digital(A/D) converter 510, and a digital-to-analog converter 509.

The ROM 506 stores a control program for controlling the electric motor 80. The control program performs for example variable speed control of the electric motor 80 by field-oriented control. Further, the ROM 506 stores a program for generating tool information of a predetermined format or monitoring an irregular state of the tool, a program for transmitting various types of data to the transmitting and receiving circuit 240 and receiving various types of data from the transmitting and receiving circuit 240, etc.

The RAM 507 stores data for operations of the microprocessor 505, data transmitted from the transmitting and receiving circuit 240, etc.

The microprocessor 505 executes the control program stored in the ROM 506. Specifically, the microprocessor 505 performs various operations, outputs control signals 504s to the inverter 210 via the D/A converter 509, transmits data to the transmitting and receiving circuit 240, and receives data from the transmitting and receiving circuit 240. The control signals 504s are for example PWM control signals.

The A/D converter 510 converts values detected by a current detector 312 of the current supplied from the inverter 210 to the electric motor 80 into a digital signal.

The electric motor 80 is provided with a rotational position detector 311. As this rotational position detector 311, for example, an optical rotary encoder or a resolver may be used.

The counter circuit 508 counts pulse signals detected by the rotational position detector 311 in accordance with the rotation of the electric motor 80 and transmits the count as output to the microprocessor 305.

When the tool 260 is attached to the spindle 46 and the spindle 46 is rotated, the secondary battery 110 is charged by the charging circuit 120. By this, the power receiving part 270 becomes operable by the electric power supplied from the secondary battery 110.

The rotation and the drive current of the electric motor 80 are fed back to the processing circuit part 504, so by preparing in advance a desired program in the ROM 506 of the processing circuit part 504, various control of the electric motor 80 becomes possible.

Further, it is also possible to transmit this control program to the tool 260 from the management apparatus 400, receive this by the transmitting and receiving circuit 240, and store it in the RAM 507.

The microprocessor 505 generates tool information of a predetermined format and transmits the information to the management apparatus 400 through the transmitting and receiving circuit 240. The management apparatus 400 manages this tool information.

Further, the information of the rotational position and the drive current of the electric motor 80 are fed back to the microprocessor 505, so it is also possible to transmit sequentially this feedback information to the management apparatus 400 together with the above tool information.

The management apparatus 400 can monitor data such as the rotational speed and the torque of the cutting tool 100. Due to this, it becomes possible to detect an irregular state such as breakage of the cutting tool 100 in real time based on the monitored various data. Further, it also becomes possible to easily manage the time used for machining.

Further, the microprocessor 505 of the processing circuit part 504 monitors the state of the generator 70 and the electric motor 80. When an irregular state occurs, it transmits this irregular state information to the management apparatus 400. When obtaining the irregular state information, the management apparatus 400 transmits this irregular state information to the numerical control apparatus 51. When the irregular state information is transmitted, the numerical control apparatus 51 controls the automatic tool changer 39 so as to detach the tool 260 from the spindle 46.

As described above, according to the present embodiment, by providing a program for controlling the tool 260 in the processing circuit part 504, it becomes possible to control the tool 260 separately from the spindle 46.

Further, by transmitting a program from the management apparatus 400 to the tool 260 and transmitting not only the simple tool information but various state information while machining to the management apparatus 400, it becomes possible to precisely manage the tool 260.

While the invention has been described by the reference to specific embodiments chosen for purpose of illustration, it should be apparent that numerous modification could be made thereto by those skilled in the art without departing from the basic concept and scope of the invention.

For example, in the above embodiments, the explanation was given with reference to a cutting tool 100 as a machining tool, but the present invention can also be applied to other machining tools such as a grinding wheel, a polishing tool, or the like.

What is claimed is:

1. A method of driving a tool attachable to a spindle of a machine tool, the tool being provided with a machining tool for machining a workpiece, an electric motor for driving said machining tool, and a generator for generating electric power to drive said electric motor by the rotation of said spindle, comprising the steps of:

generating alternating current having a frequency in accordance with the rotational speed of said spindle;

driving said electric motor by the generated alternating current; and controlling the rotational speed of said machining tool in accordance with the frequency of the alternating current.

* * * * *